(12) United States Patent
Eick et al.

(10) Patent No.: US 8,004,931 B2
(45) Date of Patent: Aug. 23, 2011

(54) DYNAMIC SOURCE PARAMETER SELECTION FOR SEISMIC VIBRATOR DATA ACQUISITION

(75) Inventors: Peter M Eick, Houston, TX (US); Joel D Brewer, Houston, TX (US); Stephen K Chiu, Katy, TX (US); Charles W Emmons, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 12 days.

(21) Appl. No.: 12/573,622

(22) Filed: Oct. 5, 2009

(65) Prior Publication Data

US 2010/0020640 A1      Jan. 28, 2010

Related U.S. Application Data

(62) Division of application No. 11/677,438, filed on Feb. 21, 2007.

(60) Provisional application No. 60/869,318, filed on Dec. 8, 2006, provisional application No. 60/888,938, filed on Feb. 8, 2007.

(51) Int. Cl.
*G01V 1/00* (2006.01)
(52) U.S. Cl. .......................................... 367/56
(58) Field of Classification Search .................. 367/38, 367/41, 46, 48, 56, 189
See application file for complete search history.

(56) References Cited

U.S. PATENT DOCUMENTS

| | | | | |
|---|---|---|---|---|
| 4,707,812 A | * | 11/1987 | Martinez | 367/46 |
| 6,088,298 A | * | 7/2000 | Onat | 367/138 |
| 6,430,510 B1 | * | 8/2002 | Thomas et al. | 702/14 |
| 6,865,488 B2 | * | 3/2005 | Moerig et al. | 702/14 |
| 7,050,356 B2 | * | 5/2006 | Jeffryes | 367/41 |
| 2007/0268781 A1 | * | 11/2007 | Meunier et al. | 367/21 |
| 2009/0076730 A1 | * | 3/2009 | Johnson et al. | 702/13 |

* cited by examiner

*Primary Examiner* — Jack Keith
*Assistant Examiner* — Krystine Breier
(74) *Attorney, Agent, or Firm* — ConocoPhillips Company

(57) ABSTRACT

A method and system of operating single vibrator source points for seismic data acquisition includes acquiring real-time field survey locations for a first plurality of seismic vibrators, determining at least one geometrical relationship between each of the first plurality of seismic vibrators as a function of the field survey locations, selecting a second plurality of seismic vibrators from the first plurality of vibrators as a function of the at least one geometrical relationship, selecting source parameter data for the second plurality of seismic vibrators as a function of the field survey locations and driving the second plurality of seismic vibrators to propagate seismic energy into the earth. A third plurality of vibrators is selected based on geometrical relationships and associated source parameters are determined based on vibrator locations. Multiple vibrator groups may acquire data continuously without interruption.

8 Claims, 9 Drawing Sheets

DYNAMIC SOURCE PARAMETER SELECTION FOR SEISMIC VIBRATOR DATA ACQUISITION

CROSS-REFERENCE TO RELATED APPLICATION

This Application is a Divisional Patent Application of U.S. Ser. No. 11/677,438, filed Feb. 21, 2007 which sets forth a claim for the benefit of U.S. Provisional Application No. 60/869,318, filed 8 Dec. 2006 and of U.S. Provisional Application No. 60/888,938, filed 8 Feb. 2007.

BACKGROUND

1. Technical Field

The present disclosure generally relates to methods and processing in the field of seismic data acquisition, and particularly to the acquisition and processing of seismic data.

2. Background Information

Seismic surveys image or map the subsurface of the earth by imparting acoustic energy into the ground and recording the reflected energy or "echoes" that return from the rock layers below. The source of the acoustic energy is usually generated by an explosion or seismic vibrators, or air guns (and marine vibrators) in marine environments.

During a seismic survey, the energy source is positioned on or near the surface of the earth. Each time the energy source is activated it generates a seismic signal that travels into the earth, is partially reflected, and, upon its return, may be recorded at many locations on the surface as a function of travel time.

The sensors that are used to detect the returning seismic energy usually take the form of sensors like geophones or accelerometers (land surveys) and hydrophones (marine surveys). The returning seismic energy is acquired from a continuous signal representing displacement, velocity or acceleration that may be represented as an amplitude variation as a function of time.

Multiple source activation/recording combinations are subsequently combined to create a near continuous image of the subsurface. A survey produces a data volume that is an acoustic image of the subsurface that lies beneath the survey area.

A seismic vibrator generally takes the form of a truck or other vehicle that has a base plate that can be brought into contact with the earth. A reaction mass in association with a baseplate is driven by a system to produce vibratory motion which travels downward into the earth via the base plate. A similar system of actuating devices operates in the marine vibrator. A survey may be designed that uses multiple vibrators, each being activated simultaneously so that the recording instruments capture a composite signal with contributions from all of vibrators. The composite signal forms a separable source vibrator record that allows for source separation through data inversion.

One vibratory seismic data acquisition method for acquiring separable source vibrator records is known as high fidelity vibratory seismic. In this method, multiple seismic vibrators are operated simultaneously, thereby creating a complex source signal wherein separate source signals from separate vibrators or groups may be separated during subsequent processing.

In separable sweep applications the contributions of each individual vibrator from the recorded composite signal in a multi-vibrator survey may be separated. The sweep signals of each vibrator are varied in such a way as to make later separation feasible. This may involve the use of phase encoding of a constant phase shift to each vibrator's signal relative to another vibrator sweep in the group. When using multiple sweeps of the vibrators, a different phase encoding scheme may be employed for each sweep.

The fidelity of the source separation depends to a large degree on the selection of an appropriate vibrator sweep parameters, a good scheme being one that leads to better (meaning higher signal to noise) source separation. Better source separation, in turn, will result in an improved data quality.

The description of the invention which follows, together with the accompanying drawings, should not be construed as limiting the invention to the examples or embodiments shown and described. This is so because those skilled in the art to which the invention pertains will be able to devise other forms of this invention within the ambit of the appended claims.

SUMMARY

The following presents a general summary of some of the many possible embodiments of this disclosure in order to provide a basic understanding of this disclosure. This summary is not an extensive overview of all embodiments of this disclosure. This summary is not intended to identify key or critical elements of the disclosure or to delineate or otherwise limit the scope of the claims. The following summary presents some concepts of the disclosure in a general form as a prelude to the more detailed description that follows.

In one embodiment for separable source seismic vibrators, operating a first group of seismic vibrators (substantially all the vibrators operating on a survey) includes selecting a second group of seismic vibrators from the first group of seismic vibrators in a field survey area as a function of geometrical relationships between the vibrators. The second group is activated to propagate seismic energy into the earth. A third group of vibrators may be selected from the first group. The third group of vibrators is activated to propagate seismic energy into the earth. There may be no time delays between the end of sweeping from one group (like the second group) and initiation of activation in a subsequent group (like the third group) or they may be activated contemporaneously and sweeps from separate groups may be overlapping in time.

In another embodiment a method of operating a first plurality of seismic vibrators having at least one geometrical relationship between each of the vibrators as a function of real-time survey locations includes selecting a second plurality of seismic vibrators as a function of the first plurality geometry. Source parameter data are selected for the second plurality of seismic vibrators and the second plurality of seismic vibrators are activated to propagate seismic energy into the earth.

The source parameter data may be provided to each of the second plurality of seismic vibrators immediately prior to each sweep, since conditions may be change dynamically during acquisition. A sweep parameter look-up table may be prepositioned within each vibrator to facilitate parameter distribution. Geometrical relationships between each of the first plurality of seismic vibrators as a function of the field survey locations include a distance between each of the first plurality of seismic vibrators and an angle between one of the first plurality of seismic vibrators and two other of the first plurality of seismic vibrators. The geometrical relationship function for selecting the second plurality of seismic vibrators may be a minimum preselected distance between each of the first plurality of seismic vibrators, a maximum preselected distance between each of the first plurality of seismic vibrators, a weighted distance between each of the first plurality of seismic vibrators or an angle between one of the first plurality of seismic vibrators and two other of the first plurality of seismic vibrators. Source parameter data may be selected as a function of the number of vibrators or a ground surface condition associated with at least one of the field survey locations. Source parameter determination may include equalizing the energy propagated at field survey locations associated with the first plurality of seismic vibrators.

In another aspect, the method may include recording, at a field sensor, at least one signal responsive to the second plurality of seismic vibrators and recording a propagation signal associated with each seismic vibrator of the second plurality of seismic vibrators to obtain a plurality of vibrator propagation signals and then processing the data with the plurality of vibrator propagation signals.

A third plurality of seismic vibrators may be selected as a function of the geometrical relationships between each of the first plurality of seismic vibrators and source parameter data determined as a function of the location of at least one vibrator in the third plurality of seismic vibrators. The third plurality of seismic vibrators is then activated to propagate energy into the earth. The second and third pluralities of seismic vibrators may utilize upsweeps and downsweeps.

Source parameter data for the seismic vibrators include: a sweep duration; a total time for all sweeps; a sweep start time; a sweep stop time; a sweep start frequency; a sweep stop frequency; a sweep as a function of amplitude and time; a sweep phase encoding; a vibrator hold down force; a number of sweep segments; pre and post sweep tapers and duration; and a sweep listen time between sweeps.

In another embodiment a control unit for a seismic data acquisition system in data communication with a first plurality of seismic vibrators includes a processor associated with memory and an application program associated with the processor for execution. The application program includes instructions to select a second plurality of seismic vibrators as a function of a geometrical relationship associated with each field survey location of the first plurality of seismic vibrators, instructions to determine source parameter data as a function of the location of at least one vibrator in the second plurality of seismic vibrators and instructions to activate the second plurality of seismic vibrators to propagate energy into the earth.

The application program may also include instructions to select a third plurality of seismic vibrators as a function of at least one geometrical relationship between each of the first plurality of seismic vibrators, instructions to determine source parameter data as a function of the field survey location of at least one vibrator in the third plurality of seismic vibrators and instructions to activate the third plurality of seismic vibrators to propagate energy into the earth.

The control unit may include a plurality of sensors for detecting a seismic event, each sensor having an output indicative of the seismic event. The determined geometrical relationship associated with each location of the first plurality of seismic vibrators may include a distance between each of the first plurality of seismic vibrators or an angle between one of the first plurality of seismic vibrators and at least two other of the first plurality of seismic vibrators.

The function of the geometrical relationship associated with each location of the first plurality of seismic vibrators for selecting the second plurality of seismic vibrators may include a minimum preselected distance between each of the first plurality of seismic vibrators, a maximum preselected distance between each of the first plurality of seismic vibrators, a weighted distance between each of the first plurality of seismic vibrators or an angle between one of the first plurality of seismic vibrators and two other of the first plurality of seismic vibrators. The source parameter data may be selected as a function of the number of vibrators or a ground surface condition associated with at least one of the field survey locations.

The application program may include instructions to substantially equalize the energy propagated at field survey locations according a preselected source acquisition effort. The application program may include instructions to provide upsweep data to the second plurality of seismic vibrators and downsweep data to the third plurality of seismic vibrators.

In yet another embodiment a set of application program interfaces are embodied on a computer readable medium for execution on a processor in conjunction with an application program for activating a first group of seismic vibrators including a first interface that receives data for selecting a second plurality of vibrators as a function of a geometrical relationship associated with vibrator associated field survey locations of the first plurality of seismic vibrators and a second interface that receives source parameter data for the second plurality of vibrators as a function of the vibrator associated field survey locations.

In another aspect the set of application interface programs include a third interface that receives instruction data for activating the second plurality of vibrators to impart energy into the earth. A fourth interface may receive data for selecting a third plurality of vibrators as a function of at least one geometrical relationship and a fifth interface that receives source parameter data for the third plurality of vibrators as a function of the vibrator associated field survey locations. A sixth interface may receive instruction data for activating the third plurality of vibrators. A seventh interface may send data for selecting the second plurality of seismic vibrators as a function of an offset distance range from each other vibrator in the first plurality of seismic vibrators. An eighth interface may send data for selecting the third plurality of seismic vibrators as a function of position within an offset distance from each other vibrator in the first plurality of seismic vibrators. A ninth interface may provide upsweep parameter data to the second plurality of seismic vibrators and downsweep parameter data to the third plurality of seismic vibrators.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION

Figure 1:
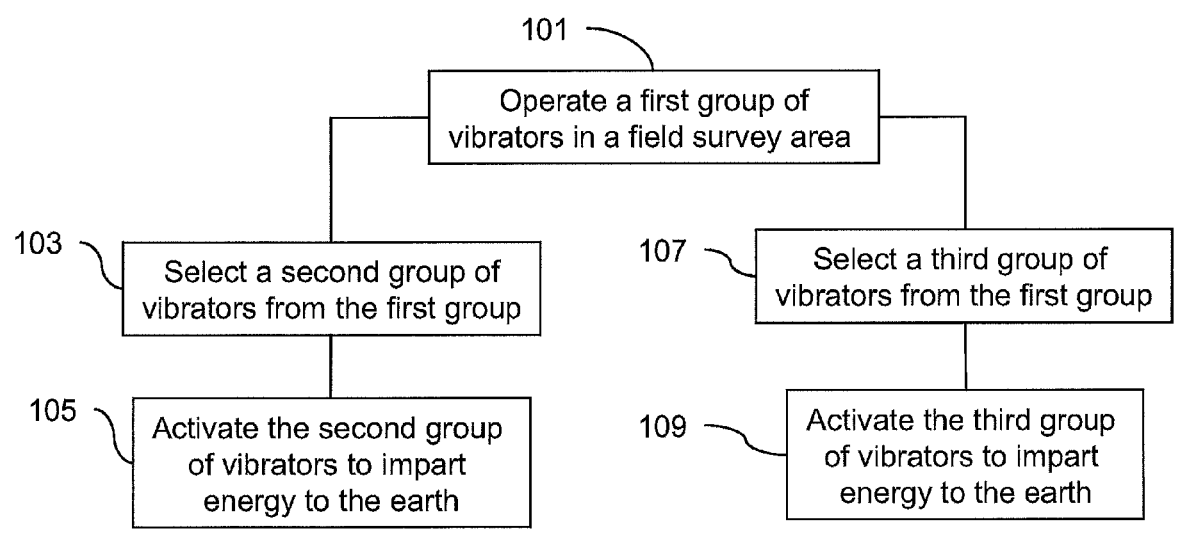
FIG. 1 is a flow chart of embodiment for continuous data acquisition.

A non-limiting illustrative embodiment of system and method for selecting vibrator units and their associated source parameter data is presented through one or more of its various aspects such as those noted below. Particular non-limiting embodiments for selecting contemporaneously operating separable single vibrator source points and related seismic vibrator-source acquisition parameters are described. Embodiments disclosed herein and equivalents that will be apparent to practitioners in the art provide for robustly increasing the efficiency of acquiring high quality seismic data.

The system and methods encompass various non-limiting aspects of operating single vibrators sources including continuous and uninterrupted data recording, optimized and variable sweep encoding parameters, dynamic sweep encoding parameter selections based on available field resources and field location conditions, maintaining a substantially uniform source energy budget for all source points, dynamic selection of vibrator units for an acquisition effort based on available real-time field resources and real-time resource management to maximize acquisition efficiency. This 'real-time' capability assures that vibrator field survey positioning is known within a preselected accuracy, for example position interrogation or reporting may take place from every few seconds up to several minutes. The real-time management function ensures that relevant data are being constantly or nearly constantly acquired as long as acquisition resources are present in the field.

The normal term for a sweep time applied per source point is "pad time." Pad time refers to the total number of seconds spent sweeping. The time subsequent to the time spent sweeping is termed the listen time. A vibrator-source seismic acquisition crew with zero down time cannot achieve more production in a work period than the total of the pad time plus the listen time.

Foregoing all or substantially all of the post-sweep listen time (i.e. a 'zero' listen time) reduces the overall acquisition effort time. Alternatively, increasing the sweep time increases the energy imparted into the earth and therefore the potential signals returned to the recording sensors. Separable sweep seismic vibrator acquisition methods require a stable matrix to enable a successful inversion, so at least as many sweeps as active vibrators involved in the setup are necessary. A listen time is not a fundamental requirement for separable sweep vibrator methods.

A minimal or no listen time increases the effective pad time for the vibes putting source energy in the ground. This may improve the data quality by increasing the effective sweep time per source point and per productive work period. Depending upon the vibrator and the electronics a minimal listen time of a few tens or hundreds of milliseconds may be necessary for the vibrator to reset and start the next sweep. Reset times for various vibrators and electronic control systems vary. Continuous recording of seismic data acquisition reduces the costs of survey acquisition while improving the overall data quality. The signal to noise ratio for acquired data is improved by minimizing the listen time and increasing the effective amount of source energy per source point by increasing the source effort or in effect increasing pad time.

For continuous and uninterrupted source output, seismic data recording systems may be operable so that recordings are made continuously over time without any interruption. Seismic recordings may be day-long records or even longer. There are several known methods to correlate timing between source event times and the data recordings.

FIG. 1 illustrates an embodiment for continuously recording seismic data from first group of seismic vibrators 101 in a field survey area. The embodiment, which may include one or more of the following (in any order), includes selecting a second group of seismic vibrators 103 from the first group of seismic vibrators in a field survey area. The second group is activated 105 to propagate seismic energy into the earth. A third group of vibrators is selected 107 contemporaneously with the second groups' energy propagation or immediately upon termination of the second group sweeping. The third group of vibrators is activated 109 to propagate seismic energy into the earth. There is no requirement for time delays between the end of sweeping from one group (like the second group) and initiation of activation in a subsequent group (like the third group) and the third group sweeps may be initially activated at any time during the time the second group is sweeping. With well determined separable source parameter data, single source vibrators and vibrator groups may begin and end sweeping arbitrarily with overlapping sweeps.

Methods for acquiring seismic data from multiple vibrators using contemporaneous and separable sweeps commonly disclose the use of four vibrators with four sweeps per setup, with vibrators located as a group with each vibrator a few meters to tens of meters from other vibrators and generally using common sweep frequencies. The sweeps usually differ only due to phase rotations, and otherwise the sweeps have the same parameters.

However, for separable sweep operations, no set numbers of vibrators, specific frequency ranges or specific phase separations are required. Using single vibrators spaced well apart, in contrast to previous practice, aids signal separation. Sweep frequency parameters and other source related variables may be different between vibrator sweeps to further optimize sweep separation. Vibrator source parameter data may be unique to each vibrator and do not have to be common for any of the total group of contemporaneously operating vibrators. Up-sweeps and down-sweeps and other variations with non-linear sweep parameters can be used to improve the conditioning of the inversion matrix to improve signal separation and increase the number of vibrator operating contemporaneously.

In a nonlimiting example, upsweep and downsweep data may be acquired with contemporaneously operating individual vibrator source stations. One group of three, four or five individual vibrators may be engaged for acquiring separable upsweep data while another group of three, four or five individual vibrators are also engaged in acquiring separable downsweep data records. This enables contemporaneous data acquisition from six to ten source stations. Of course, the number of source stations operating at any time may be dependent on equipment field position.

When using single vibrators as individual source stations it is beneficial to determine the range of distances from other contemporaneously operated vibrators to optimize source effectiveness. If two vibrators are operated too close together, the vibrators will interfere with sensors on or near the vibrator(s) such that source signal separation is less than would be optimal with a larger spatial separation. At the same time, there are also distances for vibrators such that a separation between vibrators is so great that energy from vibrators interferes by overwhelming any reflection received at the sensors near vibrators at long distances from the vibrator representing the source signal to be inverted.

Figure 2:
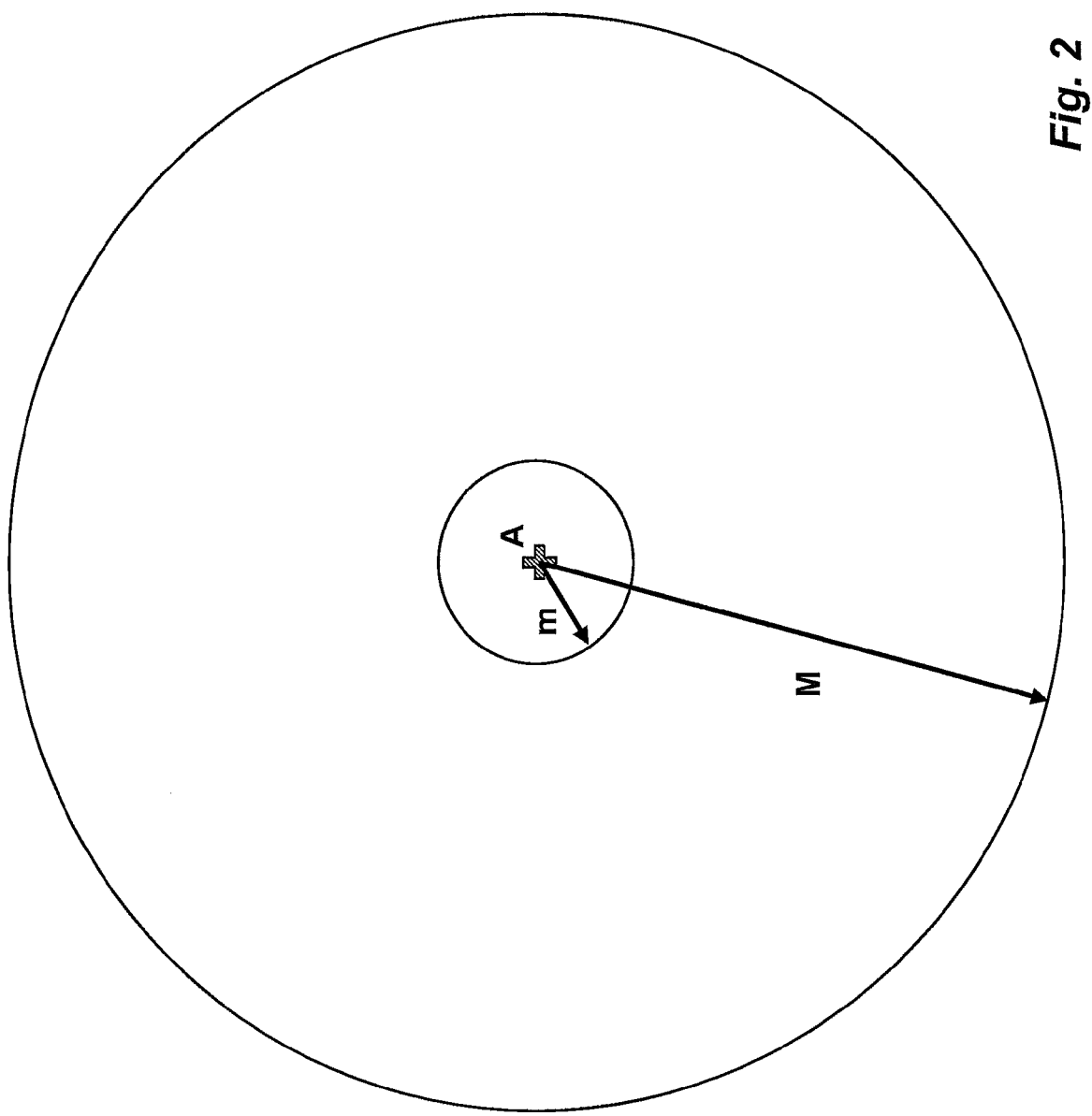
FIG. 2 is a schematic representation of a vibrator relative to a selected minimum and a relative maximum offset distance within to operate in relation to other vibrators.

As schematically illustrated in map view in FIG. 2, for a vibrator A represented by a cross-symbol, a near source minimum range of offset m is shown. For comparison, a maximum range M is shown. The area that is greater than m and less than M is the area relative to vibrator A within which other vibrators may optimally be operated so as to not overwhelm sensors in proximity to the vibrators. These distances m and M may be locally variable for different areas, even within survey areas. Adjustments or trade-offs may be made for different areas and different levels of interference that may be considered acceptable.

Figure 3:
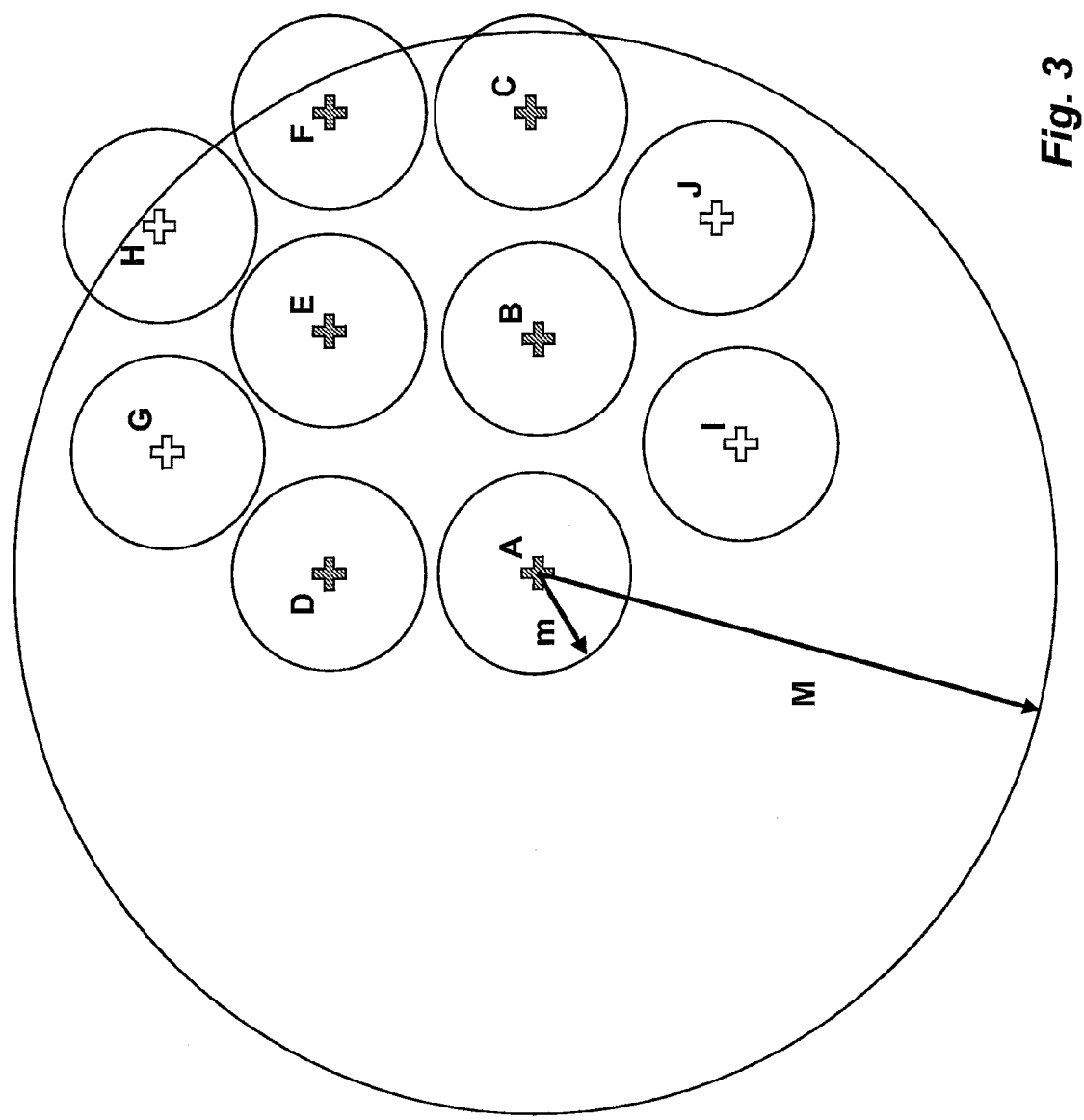
FIG. 3 is a schematic representation a vibrator relative to other vibrators for an example seismic field survey layout.

A schematic layout for 10 vibrators is illustrated in map view in FIG. 3 for vibrators A through J. The minimum selected distances for each vibrator are illustrated. Vibrators A through F (shown as the filled-in cross symbols to represent availability under the selection parameters) are in position such that any groups of from 1 to 6 of them may be chosen as a potential setup for acquisition. Vibrators I and J are too far away from vibrators G and H, and vice versa, to be used if the restrictions for not using vibrators separated by more than a distance equivalent to M are going to be used in this case. However, A through F are not further than a distance equivalent to M from any of the other vibrators A through J.

A further optimization of the set of vibrators in FIG. 3 may be affected when using multiple groups, for example when groups of three vibrators per setup have nominally been chosen. Vibrators A, B and C may be selected as one group and vibrators D, E and F may be chosen as another group. However, these two groups may provide a linear footprint to the shot selection. This footprint may be avoided by selecting A, B and D as one group and C, E and F as another group, and so may provide for a better set of recordings.

Computer simulations may be used to test sweep parameters to determine an optimal set of parameters to provide effective source separation between the vibrators used for any particular setup. These computer simulations may be determined prior to an acquisition effort. Additionally, simulations may also be performed using acquisition parameters as found during the field effort. The parameters may be tailored to the number of vibrators used, the number of sweeps and even the environmental conditions in the vicinity of one or more vibrators to be operated contemporaneously, such as the ground surface conditions and the group vibrator separations or offsets. When one or more vibrators sweep on soft soil it may be beneficial to add a sweep to the nominal number used. For example, if five sweeps were nominally used for a survey area, six sweeps may be used which adds some redundancy to any inversion as well as 'conditioning' the surface which may be beneficial for energy propagation. Additionally, shaped source wavelets for a selected source point may be acquired by having more than one vibrator occupy the same source point during repeated setups, for example with a different bandwidth of sweep or concatenated sweeps.

Using a common set of sweep frequencies, sweep types and relative phase rotations in each seismic vibrator of a group of vibrators may not yield an optimal set of sweep parameters. Any sweep parameter variables may be optimized for sweep separation, not just the relative phase rotations used for sweep phase encoding. These variable sweep parameters may be determined and provided for input to vibrator controllers any time including immediately prior to a group of vibrators finalizing their setup. To provide an optimal set of sweep parameters for a group of vibrators, one or more of a group of contemporaneously operating vibrators may use a set of sweeps or concatenated sweeps that is unique from any of the other vibrators for that setup.

Figure 4:
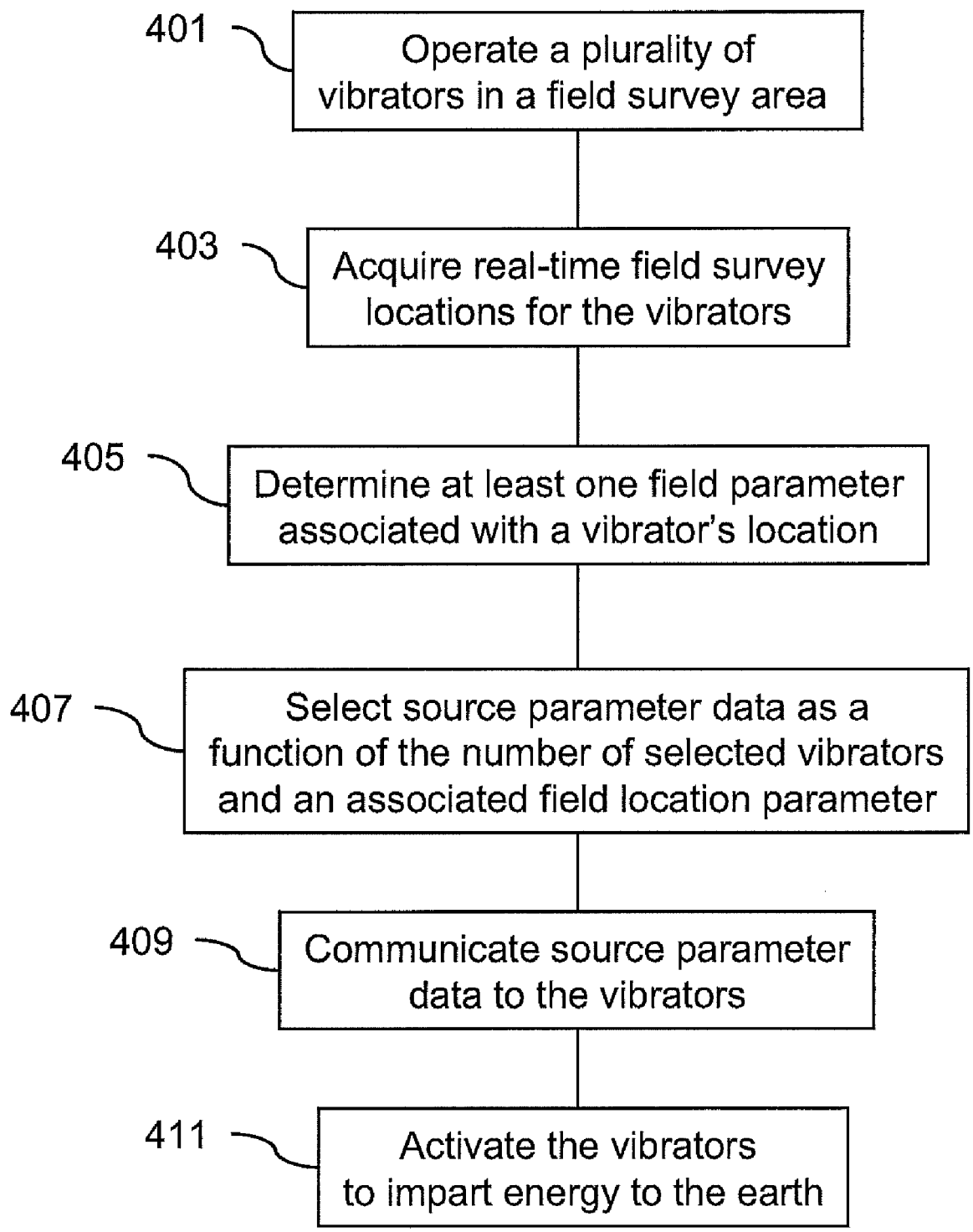
FIG. 4 is a flow chart illustrating a non-limiting embodiment of acquiring data with source parameter data selected as a function of a field location parameter.

FIG. 4 illustrates an embodiment of a method, which may include one or more of the following (in any order), for operating a plurality of seismic vibrators 401 includes acquiring real-time field survey locations 403 for a group of seismic vibrators and determining at least one associated field location parameter 405. Source parameter data for each of the plurality of seismic vibrators is selected 407 as a function of the number of vibrators in the plurality of vibrators and any associated field location parameter at any of the vibrators (such as a specific ground surface conditions that may effect sweep parameters). The selected source parameter data are communicated 409 to the plurality of vibrators and the vibrators are activated 411 to propagate seismic energy into the earth.

In another aspect the associated field location parameter that may affect a source parameter can include a weight of any of the seismic vibrators or a ground force parameter used to drive any seismic vibrators. Source parameter data communicated to the vibrators include, but are not limited to a sweep duration, sweep start and stop times, sweep start and stop frequencies, dwell time and type, pre and post tapers and rates, phase encoding, hold down force, up/down sweeps, and number of sweeps. These source parameters may be adjusted to substantially equalize the energy imparted for source point locations across the survey using any known process for estimating signal propagation.

Acquisition also includes recording at a field sensor signals responsive to the seismic vibrators, recording a propagation signal associated with each seismic vibrator to obtain a plurality of vibrator propagation signals (e.g, the ground force signal or other signal to compute a designature operator), and processing or inverting the responsive signals with the designature operator to obtain seismic records for further processing. An example of designature is a deconvolution to remove a measured or modeled wavelet, i.e., to estimate what would have resulted from an impulsive source with a broad bandwidth or a measured bandwidth of a vibrator source. Designature and deconvolution methods are well known by practitioners of seismic processing methods.

Figure 5:
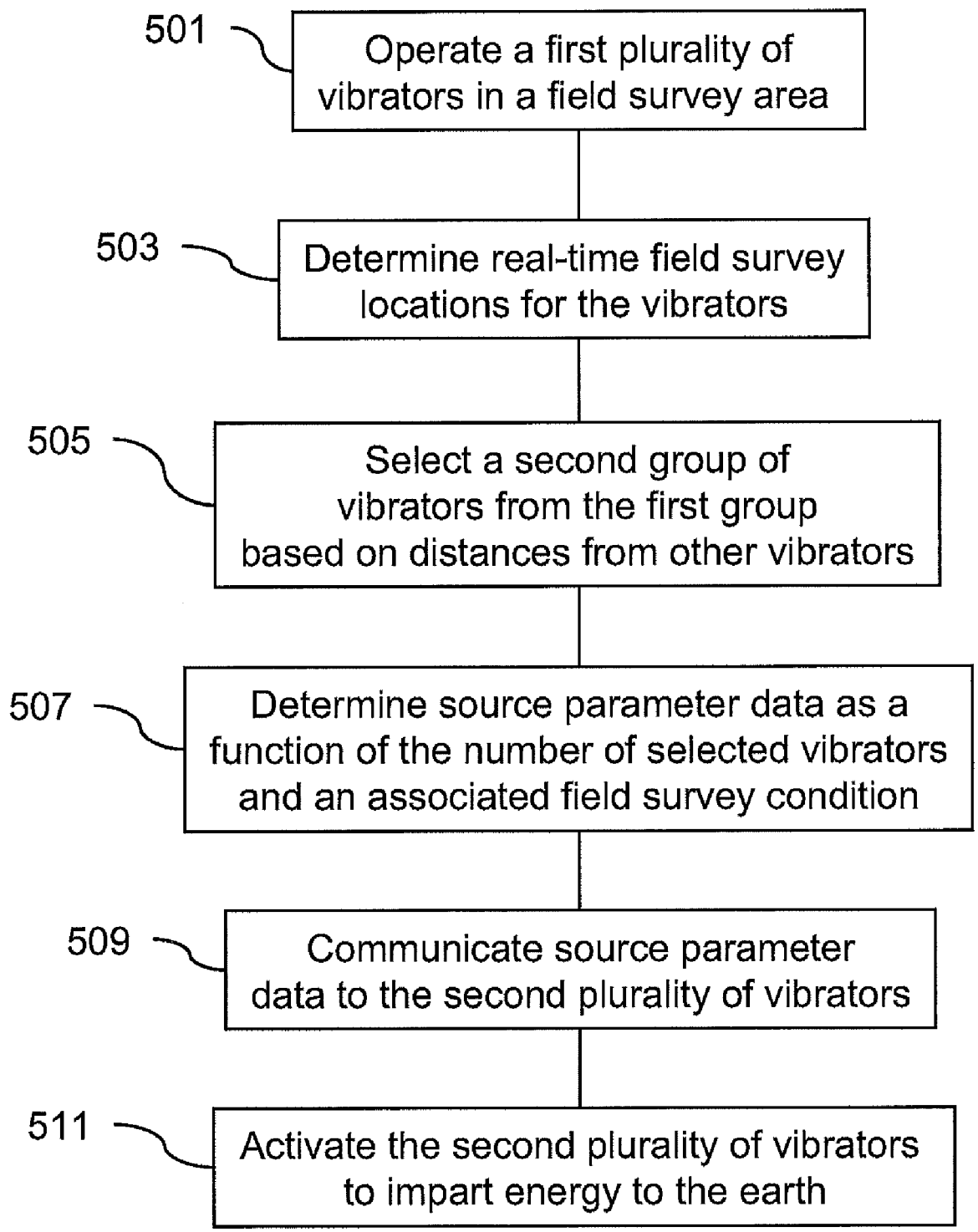
FIG. 5 is a flow chart illustrating a non-limiting embodiment of acquiring data with source parameter data selected for a subset of the vibrators operating in a survey area, the source parameter data selected as a function a field survey condition.

FIG. 5 illustrates an embodiment, which may include one or more of the following (in any order), for operating a first group 501 of seismic vibrators, which may be all the vibrators operating in a survey area, that includes determining real-time field survey locations 503 of the vibrators and selecting a second group of vibrators 505 from the first group based on relative distances between any of the first group of seismic vibrators. Source parameter data is determined 507 as a function of the second group of vibrators and field survey conditions associated with the field survey locations in vicinity of the selected vibrators. The source parameter data are sent 509 to the second group of seismic vibrators and the vibrators are activated 511 to propagate seismic energy into the earth.

The field survey condition may be the number of seismic vibrators in the second group, a weight of any of the second group of seismic vibrators, a ground surface condition at the field survey location or the ground force signal used to activate any the of seismic vibrators. A third group of seismic vibrators selected after activation of the second group of seismic vibrators may be activated, except possibly for equipment reset requirements.

Offset parameters that may affect whether to include vibrators in any group for a particular setup include selecting a seismic vibrator that is positioned greater than a preselected inter-group minimum distance from any other vibrator (e.g. m in FIG. 3), selecting a seismic vibrator that is positioned less than a preselected inter-group maximum distance from any other vibrators (e.g., M in FIG. 3) or selecting a seismic vibrator that is positioned within a preselected intra-survey maximum distance of any other of the first plurality of seismic vibrators. Alternatively, the distances may be given a weighting such that an optimized group is selected, and a group may include some vibrator pairs that would not otherwise be chosen except for maximizing recording acquisition in areas where adequate coverage has not been obtained.

Source parameter data used in separable sweep vibrator-source recordings may involve loading a fixed parameter set of phase encodings into a lookup table for a vibrator sweep encoder. The vibrator sweep encoder then cycles through the fixed number of phase encodings for each setup. Upon completion of the setup, the vibe moves to the next source point and is or has been reset to the first lookup position. These parameters are often loaded prior to a survey field effort and do not change during the acquisition program. This type of program is therefore fairly rigid and prone to inefficiencies and down time when any components, such a single vibrator unit, are not operational at all times.

Fixed numbers of sweeps and unchanging parameters may not provide an optimal set of sweeps for a group of contemporaneously operating seismic vibrators. A group of seismic vibrators may lose a member due to mechanical fault that puts the entire group on standby until replaced or repaired.

An optimal set of sweeps for multiple single-vibrator station data acquisition may depend on environmental conditions in the field and the available resources, like the number of vibrators available for recording at any particular time. One requirement for inverting separable vibrator-source sweep records is a stable matrix that contains at least as many sweeps as active vibrators involved in the acquisition setup. Different phase encoding parameters and other sweep parameters may provide for more optimal separable records than may be known prior to the field effort. If a vibrator in a group is unable to perform, the optimal sweep parameters may be reset or else the acquisition may be put on standby. Additionally, sweep parameters may be further adjusted so that processing, interpretation and analysis of seismic data may be made significantly easier by providing a uniform amount of energy be applied to each source point.

Prior art field operations often involve waiting for a set of vibrators to get into position prior to starting acquisition at the next setup. During this downtime data are not being acquired. This downtime may be minimized by the use of more than one set or group of seismic vibrators, but there may still be a significant portion of the workday that the recording crew is waiting for vibes to get into position. Positioning one or more sets of vibrators so that as soon as a first group ends an acquisition effort a subsequent group of vibrators may immediately initiate data acquisition provides that data are acquired at all times equipment is in the field.

Dynamically adjusting the number of active vibrators along with their other source parameter data via parameters transmitted in real-time during an acquisition effort provides for an optimal acquisition scheme without having to wait for a preset or preselected group. This may be especially important when various vibrator equipment is not operating at peak efficiency or one preselected group of vibrators does not have a full or nominal complement. With compensating parameter selection that may be provided in real time, the field effort does not need to incur any standby time.

For example, when one group seismic of vibrators is being used in a field effort, another group of vibrators may be preparing for a subsequent effort associated with acquisition source points and this preparation may include receiving source parameter data from a central location. Alternatively, source parameter data may complement or modify a lookup table of selectable phase encodings, ground force settings and other source parameters for different numbers of seismic vibrators, which may be loaded into and/or resident with the vibrator sweep controller. A central or control location may provide for dynamically determining the vibrator sweep controller parameters depending upon the number of vibes involved in the setup and environmental conditions in the vicinity of the group chosen to next acquire data records. An optimal number of sweeps and associated parameters is thereby selected and provided in real-time to maintain uniform source point energy for an optimal data quality as well as continuous and uninterrupted source energy propagation.

If a survey operator has selected that a desired nominal amount of energy is required per source point, the number of sweeps and/or sweep lengths with associated phase encodings may be supplied to a selected group of seismic vibrators to help ensure the effort is undertaken. These parameters may change based on available vibrators and other environmental conditions. The energy propagated into the earth to maintain a uniform source effort for each source point is dynamically adjusted depending on the available selected number of vibrators along with a selected phase encoding to be provided to the vibrator controllers that represents an optimum for the vibrators involved.

The number of vibrators to be used is dynamically adjusted and an optimal set of phase encodings or other parameters for those vibrators may be provided nearly instantaneously, which may be important during an equipment failure. On a source-point by source-point basis the number of sweeps and length of the sweeps are adjusted to maintain the uniform energy.

Figure 6:
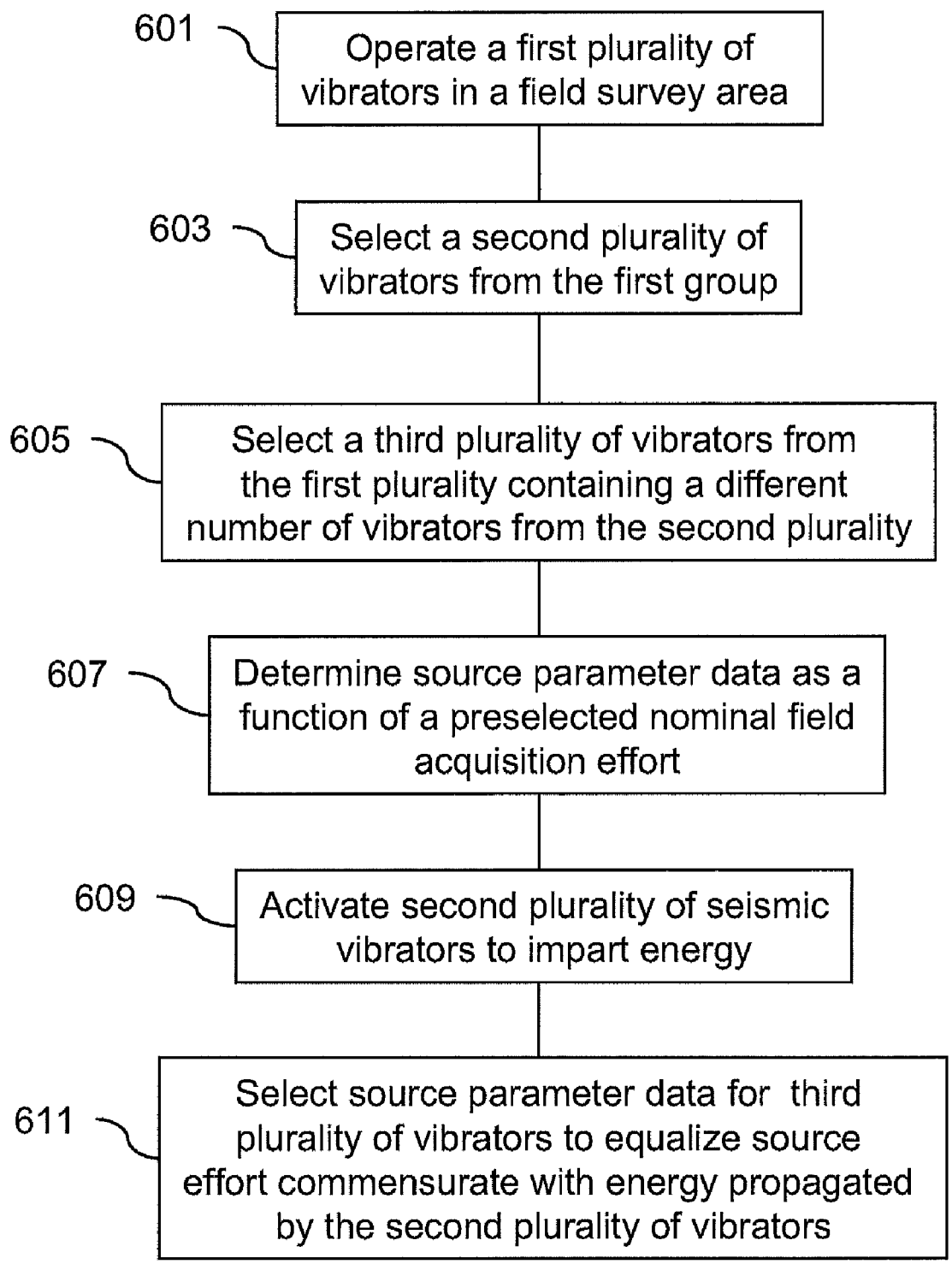
FIG. 6 is a flow chart illustrating a non-limiting embodiment of acquiring data with groups of the vibrators on a field survey wherein the groups may be composed of different numbers of vibrators.

FIG. 6 illustrates an embodiment, which may include one or more of the following (in any order), for operating a first group of seismic vibrators 601 (substantially all the vibrators operating on a survey) located at field survey locations includes selecting a second group of vibrators 603 and a third group of vibrators 605 from the first group of seismic vibrators. The second and third groups contain different numbers of seismic vibrators. Source parameter data is determined 607 as function of a preselected nominal field acquisition effort. For example, a survey may be planned such that nominal source efforts will be comprised of five vibrators that sweep five times. This second group of vibrators is then activated 609 to propagate seismic energy into the earth. Source parameter data to be provided to the third group is selected 611 to substantially equalize the energy propagated at these third group field survey locations commensurate with the energy propagated at locations for the second plurality of seismic vibrators.

In another aspect source parameter data may be further selected as a function of surface conditions associated with the field survey locations of the first plurality of seismic vibrators. In still another aspect, the third group of seismic vibrators is activated to propagate seismic energy into the earth. The preselected source acquisition effort nominally includes substantially equalizing the amount of vibrational energy imparted at all field survey locations associated with the first plurality of seismic vibrators. The vibrators in the second and third groups may be selected as a function of the vibrators' respective field survey locations. Selecting the second and third groups of vibrators from the first group of vibrators is based on the distances between locations of the vibrators.

For seismic vibrators used in separable sweep vibrator-source seismic data acquisition surveys, the vibrators not related to the active source point may appear as noise sources that contaminate the acquired data during the setup. There may be some leakage of noise between the different vibrators involved in a setup even with an optimal phase encoding.

Seismic acquisition designs for 3D-surveys have a natural tendency to include an increased number of traces in the mid and far offsets from the sources due to the increasing distance from the source when compared to the near offset. Thus near offsets may need to be protected from noise contamination. Testing in the field and computer simulations indicate that in separable sweep vibrator-source data acquisition operations, at far offsets (or as offsets increase from an active source) the noise of the vibrators involved in the setup eventually overpower the signal being recorded by the geophones or sensors at the surface. Therefore, if the vibrators are close to the receiver point they may contaminate the near source sensors and if very far apart they tend to overpower the geologic signals in the far offset sensors. For a particular field survey area or portion of a survey area, the vibrators involved in any particular set up may advantageously be selected to be within a range of offsets from each other vibrator in the group's setup.

In one embodiment a queue of available vibrators associated with a seismic data acquisition survey may be stored in computer memory in real time. A software or hardware-software combination then dynamically selects the best constellation or areal arrangement of an arbitrary number of vibes to minimize the cross contamination of noise between records. The constellation group locations (i.e., distributed source array or setup) may be highly variable (not linearly positioned relative to other vibrators) to minimize the amplitude variation with azimuth impact and footprint issues and allows optimization of the final data quality by distributing the cross contamination noise for shot records in a benign manner.

Figure 7:
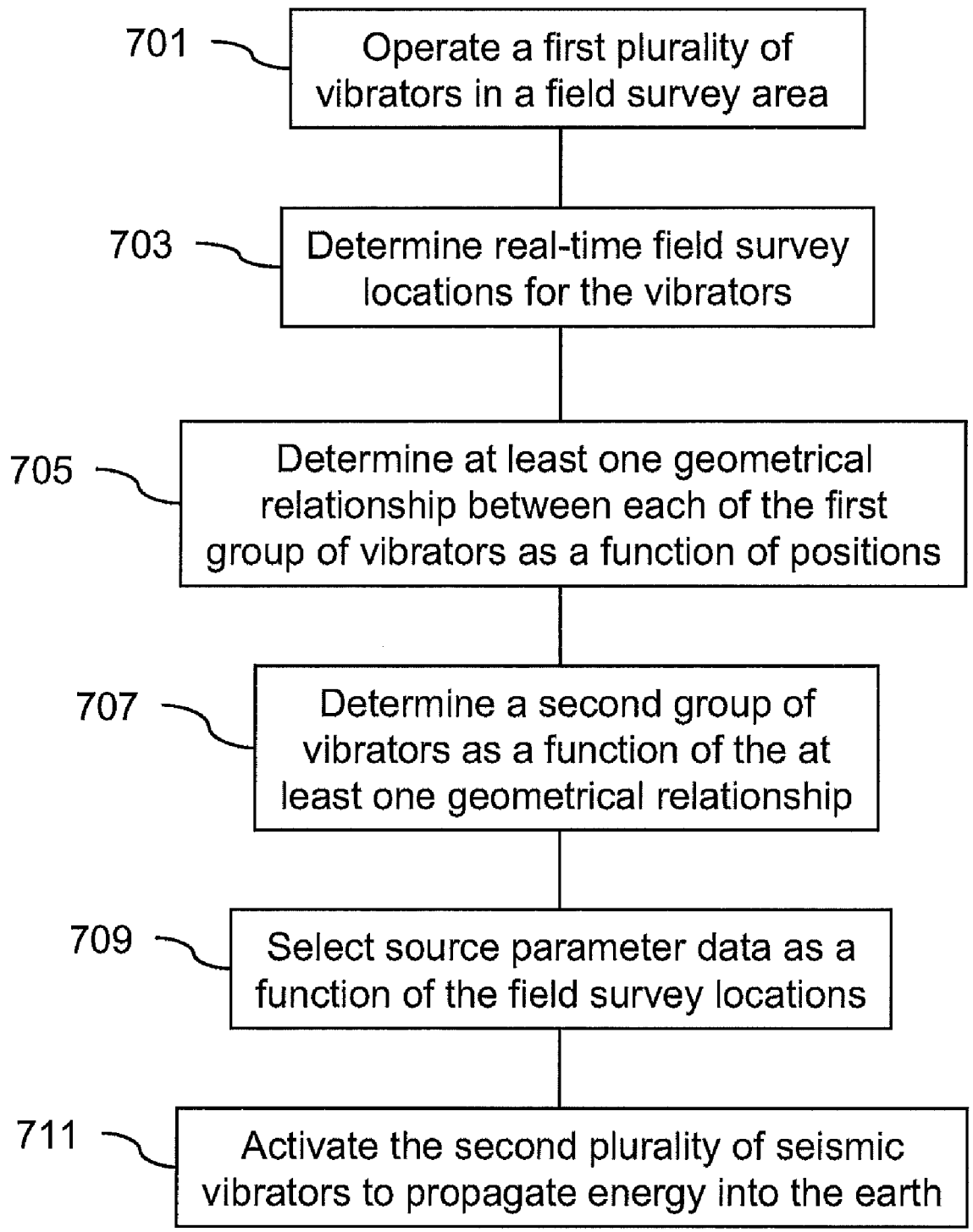
FIG. 7 is a flow chart illustrating a non-limiting embodiment wherein groups of vibrators are selected as a function of geometrical relationships.

FIG. 7 illustrates an embodiment, which may include one or more of the following (in any order), for operating seismic vibrators 701 includes acquiring real-time field survey locations 703 for a first group of seismic vibrators operating in a survey area. At least one geometrical relationship 705 between each of the first group of seismic vibrators is determined as a function of the field survey locations. From the first group, a second group of vibrators is selected 707 as a function of at least one geometrical relationship. Source parameter data is then selected 709 as a function of the field survey locations. The vibrators are then activated 711 to propagate energy into the earth. The data are then recorded for further processing.

The geometrical relationships between each of the first group of seismic vibrators as a function of the field survey locations includes a distance between each of the first plurality of seismic vibrators and may also include an angle between one of the first plurality of seismic vibrators and at least two other of the first plurality of seismic vibrators. The function of the at least one geometrical relationship for selecting the second plurality of seismic vibrators may be a minimum preselected distance between each of the first plurality of seismic vibrators, a maximum preselected distance between each of the first plurality of seismic vibrators, a weighted distance between each of the first plurality of seismic vibrators or an angle between one of the first plurality of seismic vibrators and at least two other of the first plurality of seismic vibrators. Further, the function of the field survey locations for selecting source parameter data may be the number of vibrators selected or a ground surface condition associated with at least one of the field survey locations. Selecting source parameter data may be selected to substantially equalize the energy propagated at field survey locations associated with all of seismic vibrators source acquisition effort.

Figure 8:
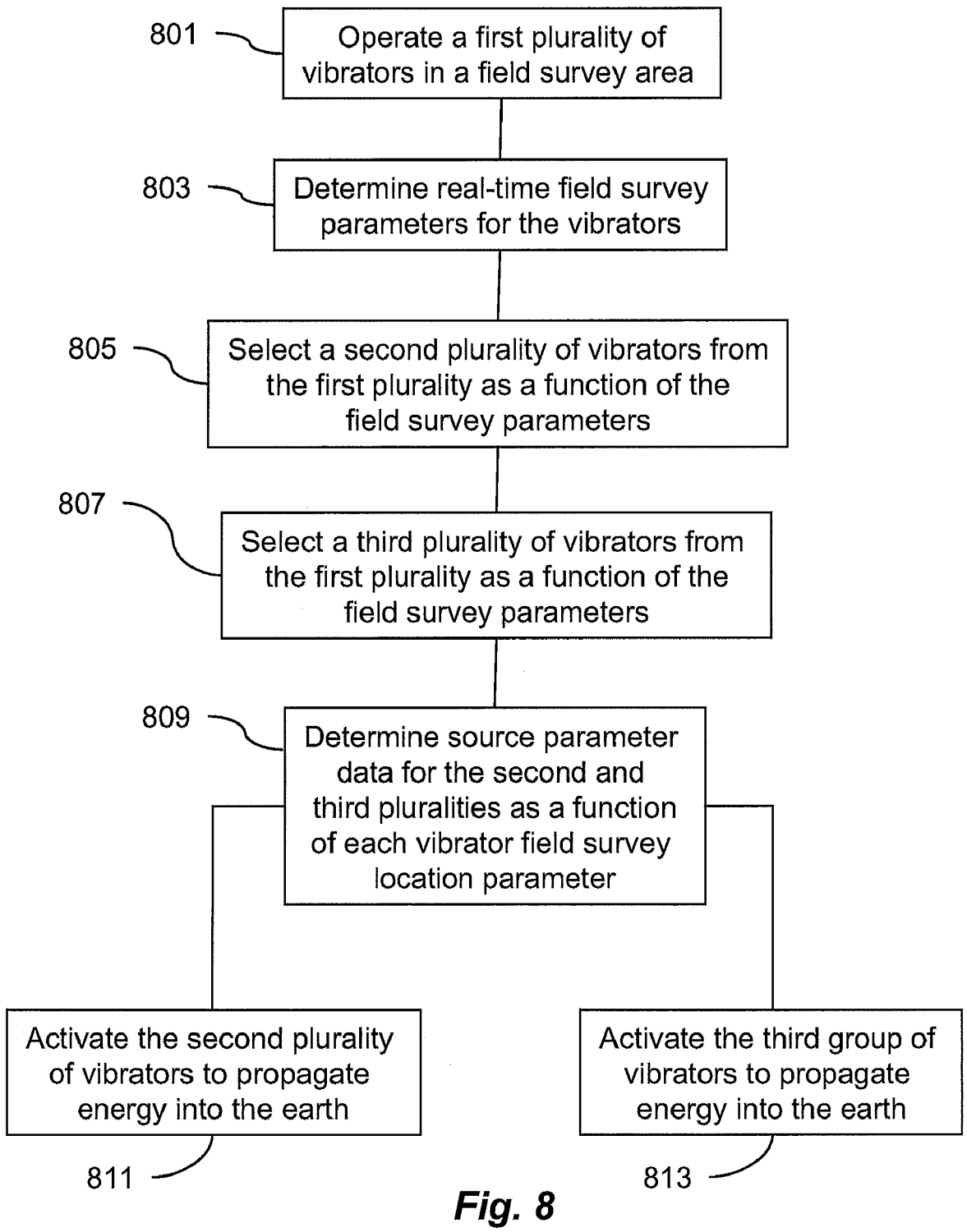
FIG. 8 is a flow chart illustrating a non-limiting embodiment of continuous data acquisition for groups of vibrators.

FIG. 8 illustrates another embodiment, which may include one or more of the following (in any order), for operating seismic vibrators 801 that includes determining field survey locations 803 for a first group of seismic vibrators operating in a survey area. A second group of vibrators 805 and a third group of vibrators 807 may be selected from the first group as a function of the field survey location parameters. For example the distances separating the vibrators and the distances each group is from another group are factors affecting selections. These distance parameters may change over a survey area. Source parameter data for the second group and third group is selected 809 as a function of each vibrator field survey location parameters. The second group of vibrators is activated 811 to propagate seismic energy into the earth and the third group of vibrators may be activated 813 to propagate seismic energy substantially when the second plurality of seismic vibrators ceases to propagate energy into the earth, so that vibrators are continuously sweeping without interruption. Alternatively, the third group of vibrators may sweep at any arbitrary time during activation of the second group of vibrators so that the acquisition from the second and third groups overlap in time. When there is no listen time between sweeps, multiple groups of vibrators may be sweeping continuously without interruption.

Acquisition using multiple groups continuously recording includes recording signals at field sensors responsive to the seismic vibrators, recording a propagation signal associated with each seismic vibrator to obtain a plurality of vibrator propagation signals (e.g, the ground force signal or other signal to compute a designature operator), and processing or inverting the responsive signals with the designature operator to obtain separated seismic records for further processing.

The fidelity of the separable sweep vibrator-source seismic data acquisition technology depends on the design of a vibrator phase encoding scheme and related sweep parameters, the location of the vibrators in space, a robust inversion algorithm and the method of field operations. This technology requires multiple vibrators to sweep simultaneously to generate a multi-vibrator gather. Within a vibrator array, each vibrator has a unique sweep. This process is repeated for a certain or predetermined multiple number of sweeps at the same source locations.

The efficiency of acquisition may be optimized by providing a method of determining the selection (of the location) of the available vibes, number of sweeps and best sweep scheme for the subset of vibes. The method is comprised of using a subset of the available vibes that minimizes the cross contamination of noise from the different vibes onto the inverted shot records.

Figure 9:
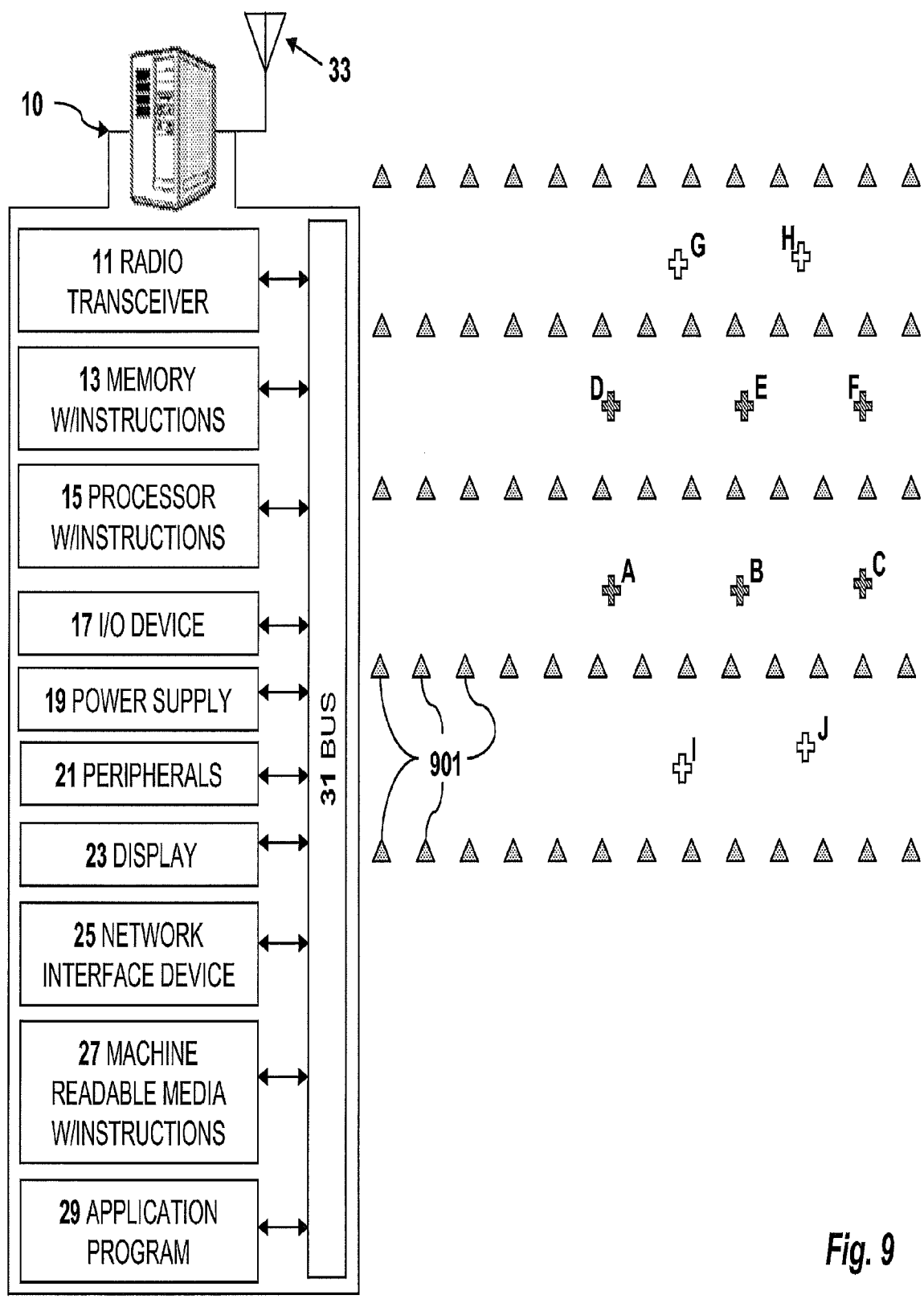
FIG. 9 illustrates a system for seismic data acquisition and a seismic data processing system or main control within which a set of instructions may enable the system to perform any of the nonlimiting embodiments or their equivalents disclosed herein.

FIG. 9 illustrates a seismic data acquisition system and that may include a control unit 10 for the acquisition system. The control unit 10 includes one or more of the components illustrated. and described herein. The seismic data acquisition system includes a first group of seismic vibrators (e.g., the vibrators deployed for a seismic survey illustrates as A through J, similar to FIG. 3), optionally a plurality of sensors 901 for detecting and recording a seismic event, each sensor having an output indicative of the seismic event.

The system includes a main control unit 10, which may be included as part of the seismic data processing system and in data communication with the first group of seismic vibrators and optionally with a plurality of sensors. Sensors recording, including sensors providing real-time position data are not required as part of the system, though timing between sources and receivers may need to be very accurately determined.for the vibrators. The location of the main control unit 10 may be anywhere relative to the physical layout of the seismic survey equipment (vibrators and sensors), and may be located at a remote site.

A computer program (one or a combination of 13, 15, 21, 27 and 29) associated with the main control unit 10 includes instructions for execution. These include instructions to determine a geometrical relationship associated with each field survey location of the first group of seismic vibrators, instructions to select a second group of seismic vibrators as a function of the geometrical relationship associated with each location of the first group of seismic vibrators, instructions to determine source parameter data as a function of the field survey location of at least one vibrator in the second group of seismic vibrators and instructions to activate the second group of seismic vibrators to propagate energy into the earth.

The computer program may also include instructions to select a third group of seismic vibrators as a function of the geometrical relationships between each of the first group of seismic vibrators, instructions to determine source parameter data to communicate to each vibrator in the third group of seismic vibrators as a function of the location of at least one vibrator in the third group of seismic vibrators, and instructions to activate the third group of seismic vibrators to propagate energy into the earth. The program may also include instructions to activate the third group of seismic vibrators to propagate energy into the earth.

The determined geometrical relationship associated with each location of the first group of seismic vibrators may be a distance between each of the first group of seismic vibrators or an angle between one of the first group of seismic vibrators and at least two other of the first group of seismic vibrators. The geometrical relationship associated with each location of the first group of seismic vibrators for selecting the second group of seismic vibrators may be one of a minimum preselected distance between each of the first group of seismic vibrators, a maximum preselected distance between each of the first group of seismic vibrators, a weighted distance between each of the first group of seismic vibrators or an angle between one of the first group of seismic vibrators and two other of the first group of seismic vibrators. The function of the location of at least one vibrator in the second group of seismic vibrators for determining source parameter data may be the number of vibrators selected or a ground surface condition associated with at least one of the field survey locations. The computer program may include instructions to substantially equalize the energy propagated at field survey locations according a preselected source acquisition effort.

In still another embodiment a set of application program interfaces is embodied on a computer readable medium (e.g., associated with one or more elements as illustrated with main control unit 10 in FIG. 9) for execution on a processor (15) in conjunction with an Application Program (29) for activating a first group of seismic vibrators may include an interface that receives vibrator associated field survey location data to recognize or determine data for selecting a second plurality of vibrators as a function of a geometrical relationship associated with vibrator associated field survey locations of the first plurality of seismic vibrators. Another interface receives data for selecting a second plurality of vibrators as a function of the geometrical relationships. Still another interface receives source parameter data for the second plurality of vibrators as a function of the vibrator associated field survey locations. Another interface receives instruction data for activating the second plurality of vibrators to impart energy into the earth. The programs may also include an interface that receives data for selecting a third plurality of vibrators as a function of at least one geometrical relationship and an interface that receives source parameter data for the third plurality of vibrators as a function of vibrator associated field survey locations. Still another interface may receive instruction data for activating the third plurality of vibrators. Another interface may also send data for selecting the second plurality of seismic vibrators as a function of an offset distance range from each other vibrator in the first plurality of seismic vibrators. Another interface may send data for selecting the third plurality of seismic vibrators as a function of position within an offset distance from each other vibrator in the first plurality of seismic vibrators.

Various aspects of embodiments in this disclosure and their equivalents may be undertaken with a seismic data processing system. A seismic data processing system may include any computer hardware and software combination operable to compute, classify, process, transmit, receive, retrieve, originate, switch, store, display, manifest, detect, record, reproduce, handle, or utilize any form of seismic information, intelligence, or data for business, scientific, control, or other purposes. For example, a seismic data processing system may be a personal computer, a super computer, a network storage device, or any other suitable device and may vary in size, shape, performance, functionality, and price. The seismic data processing may include random access memory (RAM), one or more processing resources such as a central processing unit (CPU) or hardware or software control logic, ROM, and/or other types of nonvolatile memory. Additional components of the seismic data processing system may include one or more disk drives, one or more network ports for communicating with external devices as well as various input and output (I/O) devices, such as a keyboard, a mouse, and a video display. The seismic data processing system may also include one or more buses operable to transmit communications between the various hardware components.

An example of a seismic data processing system is illustrated in FIG. 9 with a main controller FIG. 9, an embodiment of a seismic data processing system within which a set of instructions may enable the system to perform any of the nonlimiting embodiments or their equivalents disclosed herein. A seismic data processing system may be a standalone system comprising at least unit 10, with any additional computer, host computer, server or blade, or may be connected to other systems within a network. The main control unit 10 for a seismic data processing system may include a radio transceiver 11 connected to an antenna for providing wireless access to systems, networks and devices. For example, the transceiver 11 enables wireless communication with the pluralities of vibrators on a seismic survey (e.g., A through J) and may use antenna 33. In a networked deployment, the seismic data processing system may operate as a server or a client in server-client networked environment or as a member of a distributed network environment. Memory 13 may be volatile or non-volatile memory with instructions and data. A central processing unit (CPU) 15 or other processor may be included with instructions. The instructions may at least partially reside within the memory 13 and/or within the processor 15 during execution. Memory 13 and processor 15 may include machine-readable media.

Machine-readable media includes solid-state memory such as cards or other non-volatile memories, random access memories or other volatile memories, magneto-optical or optical media (e.g., disk or tape), or signals embodying computer instructions in a transmission medium. A machine-readable medium for the embodiments disclosed herein includes equivalents and successor media.

An input/output device 17 is provided to send data to, or receives data from, other system components or devices. At least one seismic data processing system bus 31 provides communication between and among components.

Additionally, main control unit 10 for a seismic data processing system may include peripherals 21 (keyboards, GPS receivers, USB adapter, headphones, microphone, wireless audio transmitter, print adapter, mouse, serial adapter, etc). Various types of display device 23 may be attached or linked with the main control unit 10. Network interface equipment such as Network Interface Controller 25 (NIC) may provide hardwired access to infrastructure. Other interfaces may include a PCI bus, and USB ports, etc. A machine readable medium with instructions 27 may be on a disk drive device and provide additional software and data storage capability to main control unit 10.

Processor 15 may carry out graphics/memory controller hub functions and enable input/output (I/O) functions for I/O device 17 and associated peripherals 21. Peripherals 21 such as a mouse, keyboard, and tablet are also coupled to other components at the option of the user. The seismic data processing system bus 31 may connect to I/O devices 17. Non-limiting examples of a seismic data processing system bus may include a Peripheral Component Interconnect (PCI) bus, PCI Express bus, SATA bus or other bus is coupled to enable seismic data processing system bus 31 to be connected to other devices which provide main control unit 10 with additional functionality. Application program interfaces of any type may interface with Application Program 29 through bus 31 to other components as needed. A universal serial bus (USB) or other I/O bus may be coupled to seismic data processing system bus 31 to facilitate the connection of peripheral devices 21 to main control unit 10. System basic input-output system (BIOS) may be coupled to processor 15. BIOS software is stored in nonvolatile memory 13 such as CMOS or FLASH memory. A network interface controller (NIC) 25 is coupled to processor 15 to facilitate connection of unit 10 to other data, information or seismic data processing systems. A media drive controller (not shown) is coupled to processor 15 through bus 21. An example of a media drive controller may include a baseboard management controller (BMC). Devices that can be coupled to media drive controller include CD-ROM drives, DVD drives, hard disk drives and other fixed or removable media drives. It should be understood that the technology disclosed herein is not only applicable to the embodiment illustrated with FIG. 9 but is also applicable to the other types of seismic data processing systems.

While various embodiments have been shown and described, various modifications and substitutions may be made thereto without departing from the spirit and scope of the invention. Accordingly, it is to be understood that the present invention has been described by way of illustrations and not limitation.

What is claimed is:

1. A control unit for a seismic data acquisition system where seismic energy is emitted into the earth from a seismic vibrator at each of a plurality of survey locations wherein a first plurality of seismic vibrators are deployed to various of the survey locations within a survey area and where each seismic vibrator, after emitting its sweep of seismic energy at a survey location, moves to another of the survey locations within the survey area to emit a subsequent frequency sweep of seismic energy into the earth until all of the survey locations have had seismic energy emitted thereupon and further wherein each swee of seismic ener from each seismic vibrator is source separable from all other sweeps of seismic energy from all other survey locations, where the seismic data acquisition system is in data communication with a first plurality of seismic vibrators comprising:

a) a processor associated with memory;
  b) an application program associated with the processor, for execution, comprising: instructions to dynamically select a second plurality of seismic vibrators from the first plurality of seismic vibrators as a function of a geometrical relationship associated with each field survey location of each vibrator, in real-time, of the first plurality of seismic vibrators; instructions to determine source parameter data as a function of the location of at least one vibrator in the second plurality of seismic vibrators; and instructions to activate the second plurality of seismic vibrators to propagate energy into the earth.

2. The control unit of claim 1 wherein the application program further comprises: instructions to dynamically select a third plurality of seismic vibrators as a function of at least one geometrical relationship between each of the first plurality of seismic vibrators; instructions to determine source parameter data as a function of the field survey location of at least one vibrator in the third plurality of seismic vibrators; and instructions to activate the third plurality of seismic vibrators to propagate energy into the earth.

3. The control unit of claim 1 further comprising a plurality of sensors for detecting a seismic event, each sensor having an output indicative of the seismic event.

4. The control unit of claim 1 wherein the determined geometrical relationship associated with each location of each vibrator of the first plurality of seismic vibrators comprises at least one of: i) a distance between each vibrator of the first plurality of seismic vibrators; and ii) an angle between one vibrator of the first plurality of seismic vibrators and at least two other vibrators of the first plurality of seismic vibrators.

5. The control unit of claim 1 wherein the function of the geometrical relationship associated with each location of the first plurality of seismic vibrators for selecting the second plurality of seismic vibrators comprises at least one of: i) a minimum preselected distance between each vibrator of the first plurality of seismic vibrators; ii) a maximum preselected distance between each vibrator of the first plurality of seismic vibrators; iii) a weighted distance between each vibrator of the first plurality of seismic vibrators; and iv) an angle between one vibrator of the first plurality of seismic vibrators and two other vibrators of the first plurality of seismic vibrators.

6. The control unit of claim 1 further comprising selecting the source parameter data as a function of at least one of: i) the number of vibrators in the second plurality of seismic vibrators; and ii) a ground surface condition associated with at least one of the field survey locations.

7. The control unit of claim 1 wherein the application program further comprises instructions to substantially equalize the energy propagated at field survey locations according a preselected source acquisition effort.

8. The control unit of claim 2 wherein the application program further comprises instructions to provide upsweep data to the second plurality of seismic vibrators and downsweep data to the third plurality of seismic vibrators.

* * * * *